United States Patent
Young

[11] Patent Number: 6,044,638
[45] Date of Patent: Apr. 4, 2000

[54] FRUIT HARVESTING TOOL

[76] Inventor: William M. Young, 26880 St. Francis Rd., Los Altos Hills, Calif. 94022

[21] Appl. No.: 09/120,097

[22] Filed: Jul. 21, 1998

[51] Int. Cl.⁷ .................................................. A01D 7/04
[52] U.S. Cl. ............................ 56/329; 56/332; 56/400.18
[58] Field of Search ................................ 56/328.1, 329, 56/330, 332, 400.18, 400.19, 400.21, 400.04, DIG. 19

[56] References Cited

U.S. PATENT DOCUMENTS

| | | | |
|---|---|---|---|
| Re. 28,764 | 4/1976 | Durkee | 56/400.15 |
| 406,744 | 7/1889 | Kriner | 56/332 |
| 422,373 | 3/1890 | Caldwell | 56/332 |
| 1,735,237 | 11/1929 | Dennis . | |
| 2,072,992 | 3/1937 | Potemkin . | |
| 2,772,534 | 12/1956 | Tarello . | |
| 3,111,175 | 11/1963 | Chambers et al. . | |
| 3,258,903 | 7/1966 | Reinacker | 56/400.18 |
| 3,394,536 | 7/1968 | Henne | 56/400.18 |
| 3,701,243 | 10/1972 | Durkee | 56/400.18 |
| 5,083,418 | 1/1992 | Reece . | |
| 5,099,637 | 3/1992 | Drusiani | 56/332 |
| 5,501,069 | 3/1996 | Lentz | 56/400.1 |
| 5,626,009 | 5/1997 | Bower et al. | 56/400.06 |
| 5,852,923 | 12/1998 | Wei . | |

*Primary Examiner*—James A. Lisehora

[57] ABSTRACT

A universal hand held tool for harvesting fruit and nuts. Harvesting is accomplished by a plurality of specially shaped spring wire tines. Tines are covered with plastic to minimize fruit and tree damage. Passing through a guide bracket secured to a handle, tines are held by a retainer that slides along the handle. Moving the retainer along the handle adjusts the tine spacing to accommodate different sizes and shapes of fruit. Retainer can be locked in any of a number of selected positions. Extension handles of various or adjustable length can be attached to harvest the crop safely from the ground. Fruit, such as olives that will be used to make olive oil, can be stripped from the branches using a raking motion into a tarp or container on the ground. To harvest for edible fruit without allowing it to fall to the ground a removable container is easily attached under the tines to capture the fruit. The container is made from a pliable material with a resilient aperture to reduce bruising or damage to the fruit. Tine attachment to the retainer has an adjustment feature that allows radial motion of the tines for spacing adjustment but prevents lateral or rotational motion thus maintaining the selected tine spacing during use.

7 Claims, 2 Drawing Sheets

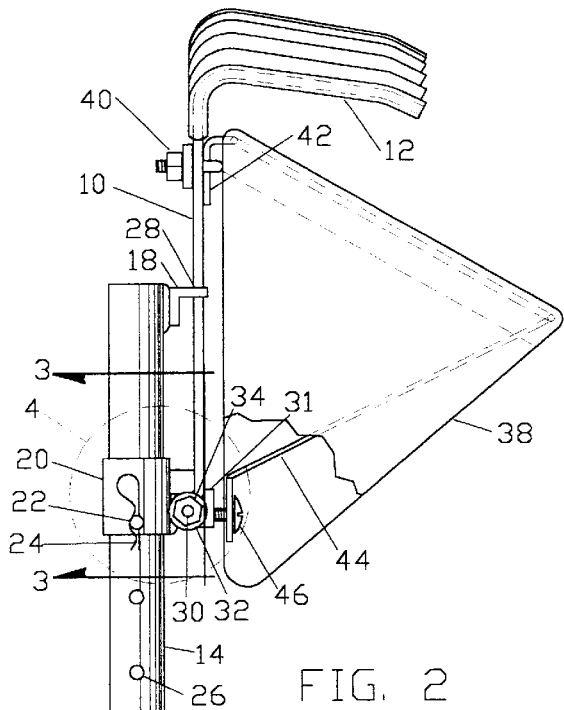
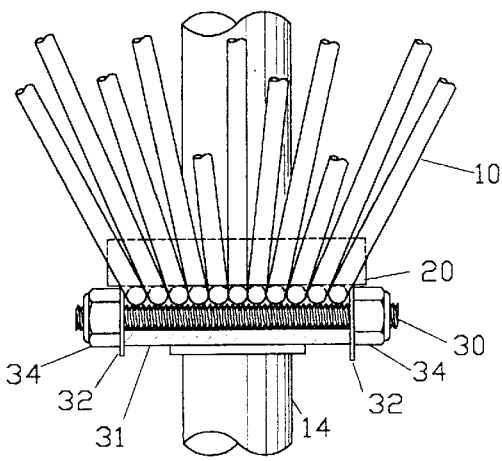
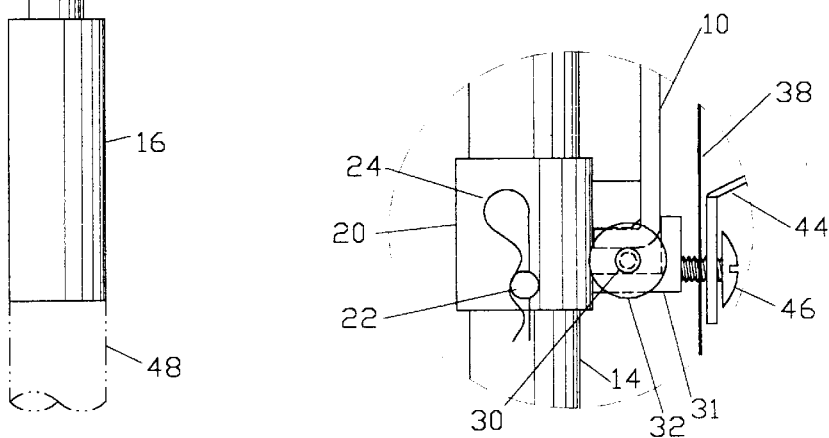

FRUIT HARVESTING TOOL

BACKGROUND

1. Field of Invention

This invention relates to a hand held tool, specifically to a universal tool used for harvesting fruit.

2. Description of prior art

Fruit may be harvested in one of two ways depending upon the final use of the crop: 1) Crops such as olives that will be used to make olive oil, nuts or similar crops are removed in the most economical way and allowed to fall to the ground. 2) In harvesting crops for edible fruit, however, the fruit cannot be allowed to fall to the ground as care must be taken not to damage or bruise the fruit.

1) Harvesting Olives for Olive Oil

Where the orchard arrangement, location, tree variety, etc. does not permit the use of shakers or other powered equipment hand harvesting with the aid of various tools is the method used. Olives may be hand picked into a container or allowed to fall into a tarp or similar device placed under the tree. Tools employed include long handled poles made from bamboo or other materials that are used to beat the branches causing the olives to fall to the ground. This process results in considerable damage to the tree. Another tool is a rake like device used in a raking motion to strip the olives from the branches. The rake device closely resembles a small standard garden rake with rigid tines spaced at a constant distance. It is made of a plastic material that breaks easily in use. Since various varieties of olives grow in different sizes the main problem is that the rake will not completely strip varieties smaller than the spacing of the tines. Also, being non-flexible the tines cannot deflect when pulled through the branches and tend to snag easily.

2) Harvesting for Edible Fruit

Fruit is hand picked and placed in a picking bag or container, not being allowed to fall to the ground where it would be damaged. Ladders are used up to about four meters which is considered the maximum safe harvesting height. The use of ladders can be hazardous particularly on sloping or rough terrain, with workers unskilled in the use of ladders, or unsafe ladders. Further, in larger trees much of the fruit is out of reach and cannot be harvested. An alternative is a harvesting tool mounted on a long pole that removes and captures the fruit in a container without damage. Such tools designed to harvest larger fruit are presently available on the market. This picker consists of a rigid wire container with relatively short, rigid wire tines located above the opening of the container. Tines and container are the same structure and cannot be separated. As the tines are too far apart for olives or other small fruit or nuts I have modified and tested this picker with more closely space tines. Test results show, however, that the size and shape of the tines and container and their relationship are such that a large percentage of the olives fall to the ground and are not collected in the basket.

Reference is made to three U.S. patents for an adjustable rake by Rienacker in U.S. Pat. No. 3,258,903, Durkee in U.S. Pat. No. 3,701,243 and Re. Pat. No. 28,764, and Henne in U.S. Pat. No. 3,394,536. Tine spacing adjustment is achieved in these patents with a handle having a guide secured to one end with a plurality of holes to slidingly receive a plurality of tines. The tines are secured at one end in a retainer that is slidably connected to the handle. Moving the retainer along the handle adjusts the tine spacing. The problem that is addressed here is in the attachment of the tines to the adapter. In the referenced patents as well as rakes currently on the market the tines are reasonably well retained longitudinally (in the long direction of the handle) and laterally (at 90 degrees to the handle). Rotationally, about the longitudinal axis, however, the tines are poorly retained with rotational looseness of up to 30 degrees being observed. Such looseness in the case of the rake is apparently not objectionable and has little effect on the function of the rake. For the long finger like shape of tine required for effective olive harvesting, however, such rotational looseness would result in uneven tine spacing and would adversely affect performance. The need or means for solving this problem are not suggested in this referenced prior art.

Objects and Advantages

It is a general object of this invention to provide a universal tool for harvesting fruit. Additional objects and advantages are:

a) To provide a harvesting tool that can be used to 1) strip the crop from the branches, allowing it to fall to the ground or 2) pick the crop for edible fruit with minimum damage.

b) To provide a removable container that can be easily attached to capture the fruit as it is stripped from the branch.

c) To provide a tool that is adjustable to effectively harvest fruits of different sizes and shapes.

d) To provide a harvesting tool to which can be attached handles of various lengths allowing the fruit to be safely harvested from the ground without the need for a ladder.

e) To provide a tool that will harvest a greater percentage of the crop at lower cost than existing methods with less damage to fruit and tree.

f) To provide an improved tine attachment method that allows radial motion of tines for spacing adjustment while securing tines in the lateral, longitudinal, and rotational directions thus maintaining constant tine spacing during use.

g) To provide a harvester that is lightweight, durable, inexpensive to manufacture, and can be effectively used by hand without the need for expensive auxiliary equipment.

Further objects and advantages of my invention will become more apparent from the following description read in conjunction with the drawings.

DRAWING FIGURES

FIG. 2 is a side elevation view of the tool illustrated in FIG. 1 showing the fruit container attached.

FIG. 3 is an enlarged sectional view of the tine attachment taken along line 3—3 of FIG. 2.

FIG. 4 is an enlarged view taken from FIG. 2 shown with adjustment nut 34 removed.

Reference Numerals in Drawings

Figure 1:
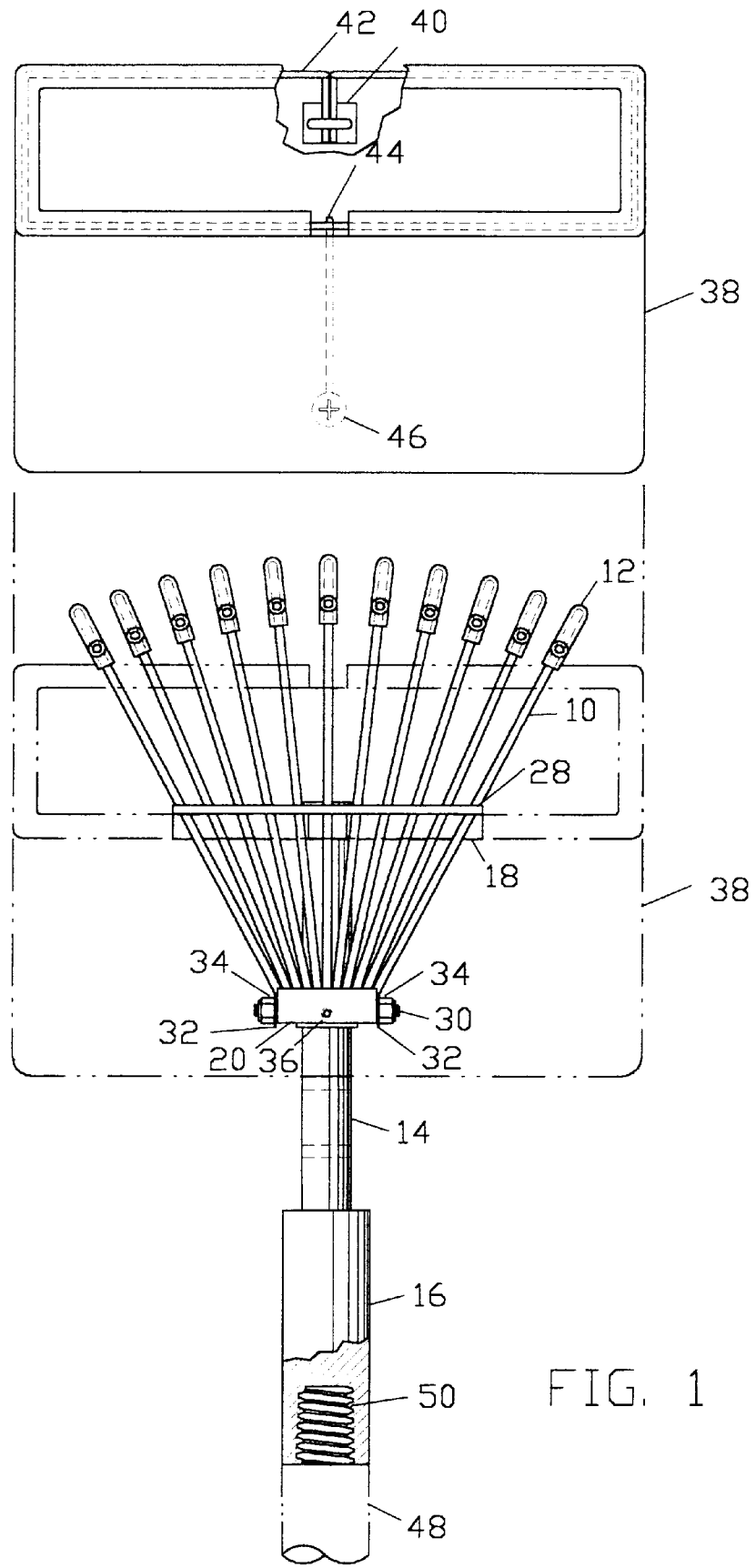
FIG. 1 is a front elevation view of one embodiment of my Fruit Harvesting Tool showing the fruit container detached.

| | |
|---|---|
| 10 | Tine |
| 12 | Tine Cover |
| 14 | Handle |
| 16 | Adapter |
| 18 | Guide |
| 20 | Tine Retainer |
| 22 | Clevis Pin |
| 24 | Locking Cotter |
| 26 | Tine Spacing Adjustment Holes |
| 28 | Tine Guide Holes |
| 30 | Adjustment Stud |

| | |
|---|---|
| | -continued |
| 31 | Angle |
| 32 | Adjustment Washer |
| 34 | Adjustment nut |
| 36 | Screw Hole |
| 38 | Container |
| 40 | Container Mounting Clamp |
| 42 | Container Wire Form |
| 44 | Motion Limit Strap |
| 46 | Attachment Screw |
| 48 | Extension Handle |
| 50 | Extension Handle Threads |

Description—FIGS. 1–4

Referring to FIG. 1 there is illustrated a harvesting tool having a handle 14. The long direction of handle 14 defines what is herein referred to as the longitudinal axis of the tool. A guide 18 is secured to one end of handle 14. Guide 18 has a plurality of holes for slidably receiving a plurality on tines 10. On the other end of handle 14 is secured an adapter 16 with threads 50 for attaching an extension handle 48. Extension handle 48 may be of any fixed or adjustable length required to reach the crop to harvested. Adapter 16 also serves as a hand grip when no extension handle is attached. It is recognized that handle 14 could be of extended length, and that extension handles 48 can attached in a number of ways. Tine 10 is made from a flexible yet resilient material, spring steel wire being preferred. Bends are formed on each end of tine 10 and are made essentially in the same plane. When mounted the straight center section is approximately parallel to the the longitudinal axis. The attachment end of tine 10 is formed at an approximate right angle for attachment to tine retainer 20. The opposite or harvesting end of tine 10 is formed at an acute angle with respect to the longitudinal axis, and is of sufficient length to strip the fruit located within a branch. The harvesting end thus formed may be straight or formed at an additional inward angle or curvature near the end to improve the stripping action. All of tines 10 are formed approximately identical. As mounted, tines 10 form an arc which together with the acute angle serve to direct the stripped fruit inwardly toward the container. To reduce tree and fruit damage the harvesting end may be covered with a flexible material. Plastic tubing such as Vinyl is the preferred material for cover 12. The retainer 20 has an L shaped slot to receive tines 10 and a circular bore to slidably receive handle 14. To adjust the tine spacing a number of holes are drilled in the handle 14 to match a hole drilled in retainer 20. To lock the tines in any selected position a clevis pin 22 is inserted through the matching holes 26. A locking cotter 24 inserted through the hole in the end of clevis pin 22 secures clevis pin 22 in hole 26. Other methods of locking retainer 20 to handle 14 are available; however, the method illustrated is preferred as it provides a positive lock against the longitudinal forces resulting from the raking action and prevents rotational movement of the retainer on the handle.

Referring to FIGS. 3 and 4 adjustment stud 30 is secured within the L shaped slot of tine retainer 20, for example, by welding. Stud 30 serves as a longitudinal restraint for tines 10 and washers 32 serve as an end restraint. With nut 34 and washer 32 removed tines 10 can be assembled through an open end of the slot. Angle 31 is a part of retainer 20 and serves as a lateral and longitudinal restraint for tines 10 as well as a bearing surface for retaining washers 32. The length of angle 31 between retaining washers 32 is made less than the total length of the assembled tines 10 between retaining washers 32. Further, washers 32 bear on tines 10 a minimum length equal to two times tine 10 diameter. Tightening nuts 34 sufficiently eliminates end play or looseness of the tines within the slot and therefore prevents lateral and rotational movement, substantially providing constant tine spacing during use. Washers 32 bear only on the bent down part of the end tines 10 providing angular freedom of motion for the tines 10 to fan out when adjusted. The method of eliminating end play of tines 10 in the slot is illustrative only, and other suitable means may be employed.

Referring to FIGS. 1 and 2 container 38 is made from a pliable, durable material such as fabric or plastic to the approximate shape shown. As illustrated the width of container 38 is greater than the maximum spread of tines 10 and slopes down and outward a greater length than tines 10. The depth is of sufficient length for container 38 to hold a quantity of fruit. The side of container 38 adjacent to the straight section of tines 10 is greater than the front or opposite side. As a result, the front of the aperture plane is inclined downward at an acute angle with respect to the longitudinal axis, thus, allowing tines 10 access to the fruit. Wire form 42 is contained within a hem or enclosure formed around the aperture of container 38. Ends of wire form 42 are bent to form tangs which are used to mount container 38 to the center tine 10 using mounting clamp 40. Attaching container 38 to a tine 10 insures that it always remains at the same relative position with respect to the tines 10. Mounting clamp 40 is a standard U or cable clamp, although, any suitable attachment method can be used. Spring steel wire is the preferred material for form wire 42 and being flexible yet resilient allows container 38 to deflect and conform to the shape of the branch. Strap 44 is made from a flexible material such as a cable with loop formed in each end. One end is looped around wire form 42 at the outer edge of container 38 and the other end attaches to the retainer 20 with screw 46. Screw 46 passes through the loop in strap 44 and also through a hole formed in the material of container 38. The purpose of strap 44 is to limit the upward deflection of container 38 as it passes through the branches.

Operation

Adjusting the tine spacing to match the size and shape of crop to be harvested consists of sliding retainer 20 along handle 14. Sliding retainer 20 toward guide 18 increases the spacing. Sliding retainer 20 away from guide 18 decreases the spacing. Retainer 20 is locked to handle 14 in by inserting clevis pin 22 in the selected matching holes and retaining with locking cotter 24. As wear occurs during use nuts 30 can be tightened to eliminate any lateral or rotational movement of tines 10.

With container 38 removed and extension handle 48 attached a raking motion is used to strip the branches. Flexible spring steel fingers formed on the ends of tines 10 flow through the branches quickly and efficiently harvesting the crop.

When it is desired to pick fruit with minimum possible damage, container 38 can be quickly attached using clamp 40 and screw 46. Container 38 being made from a pliable material cushions the fall reducing damage to the fruit. Flexible tine covers 12 effectively increase tine diameter which in turn reduces contact pressure and thus damage to fruit and tree. Attached to the center tine 10 container 38 always remains close to the stripping fingers capturing more fruit. The opening of container 38 being flexible allows it to flow over fruit and branches resulting in less fruit falling to the ground and more being captured in container 38.

Conclusions, Ramifications and Scope

For use either as a stripper or picker the universal Fruit Harvesting Tool presented herein offers significant features and advantages:

A safer harvesting method without use of a ladder.

Adjustable tine spacing for different size fruit.

Efficient tine shape, structure, and tine covers providing for faster crop removal and less damage to fruit and tree.

Specially designed fruit catching container that can be easily attached or detached.

Improved tine attachment method.

Light weight, durable and easy to use tool.

Although a specific embodiment of this invention has been shown and described, it will be understood that it is merely illustrative and that various modifications may be made therein without departing from the scope and spirit of this invention. For example, constant tine spacing can also be achieved by attaching the tines to a retainer having properly designed individual holes rather than collectively in a slot as illustrated. As a further example, certain orchards may produce fruit of essentially the same size. In this case tine spacing adjustment would not be needed and could be fixed at a predetermined dimension. The tine retainer could then be fixed directly to the handle, for example, by welding. Thus, the bore through which the handle slides, tine spacing adjustment holes, clevis pin, and locking cotter could be eliminated.

What is claimed is:

1. A universal harvesting tool for fruit comprising a handle of suitable length, the long direction of said handle defining the longitudinal axis of said tool, a tine guide secured transversely to one end of said handle, the length of said tine guide defining the transverse axis of said tool, said tine guide having a plurality of laterally spaced apart holes, a plurality of tines slideably extending through said tine guide holes, said tines being bent on each end, one of said ends being referred to as the attachment end and the other as the harvesting end, a tine retainer having an axial bore through which said handle slideably extends, a locking means where said retainer can be locked to said handle in selected positions along said handle, said locking means maintaining said tine retainer in a fixed angular position about said longitudinal axis with respect to said tine guide, a transverse open ended L shaped slot formed as an integral part of said tine retainer, said slot having the size, shape, and orientation to collectively contain said attachment ends of said tines, said slot retaining said tines in both the longitudinal direction and in the vertical direction at right angles to said longitudinal axis and said transverse axis, an adjustable and removable slot end tine retaining means, said slot end tine retaining means attaching to said tine retainer and bearing on the attachment ends of the two outer tines, said slot end tine retaining means securing said tines within said slot while allowing angular freedom of motion for tine spacing adjustment, said slot end tine retaining means when sufficiently adjusted inward against said tines eliminating end play or looseness of said tines within said slot whereby rotational movement of said tines about said longitudinal axis is prevented and the selected spacing of said tines at said harvesting end is maintained.

2. A harvesting tool as defined in claim 1 wherein said slot end tine retaining means is comprised of threaded studs transversely extending and secured to each end of the structure forming said L shaped slot, washers and nuts assembled on said studs, said washers bearing on both the bent down part of said attachment end of the two outermost of said tines and the structure forming said L shaped slot, said washers bearing on said tines a minimum length equal to two times tine diameter, the length of said slot structure being less than the total length of the diameters of said tines assembled within said slot, whereby said nuts when tightened properly tightened eliminate end play or looseness of said tines within said slot.

3. A harvesting tool as defined in claim 1 wherein the material used to form said tines is flexible and resilient.

4. A harvesting tool as defined in claim 1 wherein the diameter of the harvesting ends of said tines is larger than said attachment ends of said tines, said larger diameter being formed by flexible covers secured to said tines.

5. A harvesting tool as defined in claim 1 wherein the harvesting end of said tines are formed at an acute angle with respect to said longitudinal axis with an additional inward angle or curvature being formed near the end of said tines.

6. A harvesting tool as defined in claim 1 further comprising a container with a size and shape suitable for mounting under the harvesting end of said tines to capture and hold a quantity of fruit, an attachment means to attach said container to at least one of said tines, said attachment means allowing said container to be readily attached or detached as needed.

7. A harvesting tool as defined in claim 1 wherein said container has an aperture wider than the maximum spread of said tines, a length greater than the forward extent of said tines, a depth sufficient to hold a quantity of fruit, the shape of said aperture being formed by a flexible and resilient material, the front of the plane containing said aperture being inclined down at an acute angle with respect to said longitudinal axis.

* * * * *